(12) United States Patent
Fahrner

(10) Patent No.: US 12,345,612 B2
(45) Date of Patent: Jul. 1, 2025

(54) TRANSLATING SECTIONS OF AN ICING WIND TUNNEL TO EXPAND WATER DROPLET RANGE

(71) Applicant: Goodrich Corporation, Charlotte, NC (US)

(72) Inventor: Alan J. Fahrner, Canton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 383 days.

(21) Appl. No.: 17/958,078

(22) Filed: Sep. 30, 2022

(65) Prior Publication Data

US 2024/0110842 A1    Apr. 4, 2024

(51) Int. Cl.
 *G01M 9/04*    (2006.01)
 *G01M 9/06*    (2006.01)

(52) U.S. Cl.
 CPC .............. *G01M 9/04* (2013.01); *G01M 9/065* (2013.01)

(58) Field of Classification Search
 None
 See application file for complete search history.

(56) References Cited

U.S. PATENT DOCUMENTS

| | | | |
|---|---|---|---|
| 3,111,843 A | 11/1963 | Fredette | |
| 5,405,106 A * | 4/1995 | Chintamani | G01M 9/04 73/147 |
| 5,627,312 A * | 5/1997 | Krynytzky | G01M 9/04 73/147 |
| 8,650,944 B2 * | 2/2014 | Meis | G01M 9/04 73/147 |
| 2020/0182741 A1 | 6/2020 | Meis et al. | |
| 2024/0094085 A1 * | 3/2024 | Carpino, II | B05B 1/3053 |

FOREIGN PATENT DOCUMENTS

| | | | | |
|---|---|---|---|---|
| CN | 102435412 A | * | 5/2012 | |
| CN | 203643124 | | 6/2014 | |
| CN | 111413061 A | * | 7/2020 | .............. G01M 9/02 |
| CN | 212493555 | | 2/2021 | |
| CN | 110320002 | | 5/2021 | |
| CN | 113670557 | | 11/2021 | |
| DE | 3524784 | | 1/1987 | |
| WO | 2017/142461 | | 8/2017 | |

OTHER PUBLICATIONS

European Patent Office, European Search Report dated Feb. 13, 2024 in Application No. 23200659.3.
Collins Aerospace, "Icing Wind Tunnel", dated Jan. 1, 2019, XP093125538, Retrieved from the Internet: url: https://www.goodrichdeicing.com/images/uploads/documents/Goodrich_Icing_Wind_Tunnel_-_Uniontown,_OH,_USA.pdf, [retrieved on Jan. 30, 2024] the whole document, 2 pages.

* cited by examiner

*Primary Examiner* — Daniel S Larkin
(74) *Attorney, Agent, or Firm* — SNELL & WILMER L.L.P.

(57) ABSTRACT

A system is provided for translating sections of an icing wind tunnel to expand a size range of water droplets. The system includes: a set of actuators coupled to a set of sections of the icing wind tunnel; and a controller coupled to the set of actuators, wherein the controller is configured to: receive data relating to a water droplet generated within the icing wind tunnel; determine a directional impact on a model within the icing wind tunnel based upon the data relating to the water droplet; and adjust at least one of the set of sections of the icing wind tunnel in at least one of an up or a down direction in a subsequent test.

20 Claims, 7 Drawing Sheets

TRANSLATING SECTIONS OF AN ICING WIND TUNNEL TO EXPAND WATER DROPLET RANGE

FIELD

The present disclosure relates to systems and methods for expanding the water droplet size range available for testing in an icing wind tunnel, and more specifically, to translating sections of an icing wind tunnel to expand the size range of water droplets available for testing of ice collection on models.

BACKGROUND

Certification for Flight in Known Icing is accomplished through a combination of Natural Icing Flight Test, Dry Air Flight Tests and Wind Tunnel Tests (tests performed in calibrated icing wind tunnels). In 2015, the Federal Aviation Administration (FAA) added Title 14 Federal Aviation Regulation (FAR) Part 25 Appendix O for Supercooled Large Drop Icing Conditions to Title 14 FAR Part 25 Appendix C Atmospheric Icing Conditions. The Title 14 FAR Part 25 Appendix C covers two main forms of inflight icing, Continuous Maximum Icing and Intermittent Maximum Icing.

Appendix C describes continuous maximum icing as a maximum continuous intensity of atmospheric icing conditions (continuous maximum icing) defined by the variables of the cloud liquid water content, i.e., water in a discrete liquid phase, the mean effective diameter of the cloud droplets, the ambient air temperature, and the interrelationship of these three variables. Appendix C further describes intermittent maximum icing as an intermittent maximum intensity of atmospheric icing conditions (intermittent maximum icing) defined by the variables of the cloud liquid water content, the mean effective diameter of the cloud droplets, the ambient air temperature, and the interrelationship of these three variables. Appendix C still further describes takeoff maximum icing as a maximum intensity of atmospheric icing conditions for takeoff (takeoff maximum icing) defined by the cloud liquid water content of 0.35 g/m$^3$, the mean effective diameter of the cloud droplets of 20 microns, and the ambient air temperature at ground level of minus 9 degrees Celsius (−9° C.) or 15.8 degrees Fahrenheit (15.8° F.). The supercooled liquid water droplet size range described in Appendix C is generally from 15-micron water drops to 50-micron water drops.

Appendix O describes icing conditions defined by the parameters of altitude, vertical and horizontal extent, temperature, liquid water content, and water mass distribution as a function of drop diameter distribution. Appendix O describes freezing drizzle (conditions with spectra maximum drop diameters from 100 μm to 500 μm) as: (1) Pressure altitude range: 0 to 22,000 feet mean sea level (MSL); (2) Maximum vertical extent: 12,000 feet; (3) Horizontal extent: Standard distance of 17.4 nautical miles; (4) Total liquid water content; (5) Drop diameter distribution; and (6) Altitude and temperature envelope. Appendix O further describes freezing rain (conditions with spectra maximum drop diameters greater than 500 μm) as: (1) Pressure altitude range: 0 to 12,000 ft MSL; (2) Maximum vertical extent: 7,000 ft; (3) Horizontal extent: Standard distance of 17.4 nautical miles; (4) Total liquid water content; (5) Drop Diameter Distribution; and (6) Altitude and temperature envelope. Appendix C still further describes a horizontal extent such that the liquid water content for freezing drizzle and freezing rain conditions for horizontal extents other than the standard 17.4 nautical miles can be determined by the value of the liquid water content, multiplied by the factor, which is defined by the following equation:

$$S=1.266-0.213 \log 10(H)$$

where: S=Liquid Water Content Scale Factor (dimensionless) and H=horizontal extent in nautical miles. Since the supercooled drops used in Appendix O conditions may have significantly more mass than the drops in Appendix C conditions, the drops in Appendix O may be more affected by gravity.

SUMMARY

Disclosed herein is a system for translating sections of an icing wind tunnel to expand a size range of water droplets, the system including: a set of actuators coupled to a set of sections of the icing wind tunnel; and a controller coupled to the set of actuators, where the controller is configured to: receive data relating to a water droplet generated within the icing wind tunnel; determine a directional impact on a model within the icing wind tunnel based upon the data relating to the water droplet; and adjust at least one of the set of sections of the icing wind tunnel in at least one of an up or a down direction in a subsequent test.

In various embodiments, the set of sections includes a contraction section, a test section, and a diffuser section. In various embodiments, the set of actuators includes a first set of actuators, a second set of actuators, and a third set of actuators, where the first set of actuators is coupled to the contraction section, the second set of actuators is coupled to the test section and the third set of actuators is coupled to the diffuser section. In various embodiments, horizontal panels of the contraction section and the diffuser section are comprised of flexible materials that provide for the contraction section and the diffuser section to translate in at least one of an up or a down direction to follow the test section. In various embodiments, the test section rotates about an axis that is perpendicular to an air flow within the icing wind tunnel.

In various embodiments, the data about the water droplet includes at least one of a droplet size or a droplet direction. In various embodiments, the system further includes: a sensor, where the sensor sends a laser beam to identify the droplet size or the droplet direction into the icing wind tunnel where drops of water are generated by spray bars. In various embodiments, the sensor is a laser sensor system. In various embodiments, when one or more of the set of sections is translated downward, the water droplet is generated from an upper quadrant of spray bars in the icing wind tunnel.

Also disclosed herein is a control system for translating sections of an icing wind tunnel to expand a size range of water droplets, the control system includes: a set of actuators coupled to a set of sections of the icing wind tunnel; and a controller coupled to the set of actuators; and a tangible, non-transitory memory configured to communicate with the controller, the tangible, non-transitory memory having instructions stored thereon that, in response to execution by the controller, cause the controller to perform operations comprising: receive data about a water droplet generated within the icing wind tunnel; determine a directional impact on a model within the icing wind tunnel based upon the data relating to the water droplet; and adjust at least one of the set of sections of the icing wind tunnel in at least one of an up or a down direction in a subsequent test.

In various embodiments, the set of sections includes a contraction section, a test section, and a diffuser section. In various embodiments, the set of actuators includes a first set of actuators, a second set of actuators, and a third set of actuators, where the first set of actuators is coupled to the contraction section, the second set of actuators is coupled to the test section and the third set of actuators is coupled to the diffuser section. In various embodiments, horizontal panels of the contraction section and the diffuser section are comprised of flexible materials that provide for the contraction section and the diffuser section to translate in at least one of an up or a down direction to follow the test section. In various embodiments, the test section rotates about an axis that is perpendicular to an air flow within the icing wind tunnel. In various embodiments, the data about the water droplet includes at least one of a droplet size or a droplet direction. In various embodiments, the control system further includes: a sensor, where the sensor sends a laser beam into the icing wind tunnel to identify the droplet size or the droplet direction where drops of water are generated by spray bars.

In various embodiments, the sensor is a laser sensor system. In various embodiments, when one or more of the set of sections is translated downward, the water droplet is generated from an upper quadrant of spray bars in the icing wind tunnel.

Also disclosed herein is a method for translating sections of an icing wind tunnel to expand a size range of water droplets, the method including: receiving data about a water droplet generated within the icing wind tunnel; determining a directional impact on a model within the icing wind tunnel based upon the data relating to the water droplet; and adjusting at least one of a set of sections of the icing wind tunnel in at least one of an up or a down direction in a subsequent test. In various embodiments, the data about the water droplet includes at least one of a droplet size or a droplet direction, where a sensor sends a laser beam to identify the droplet size or the droplet direction into the icing wind tunnel where drops of water are generated by spray bars.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
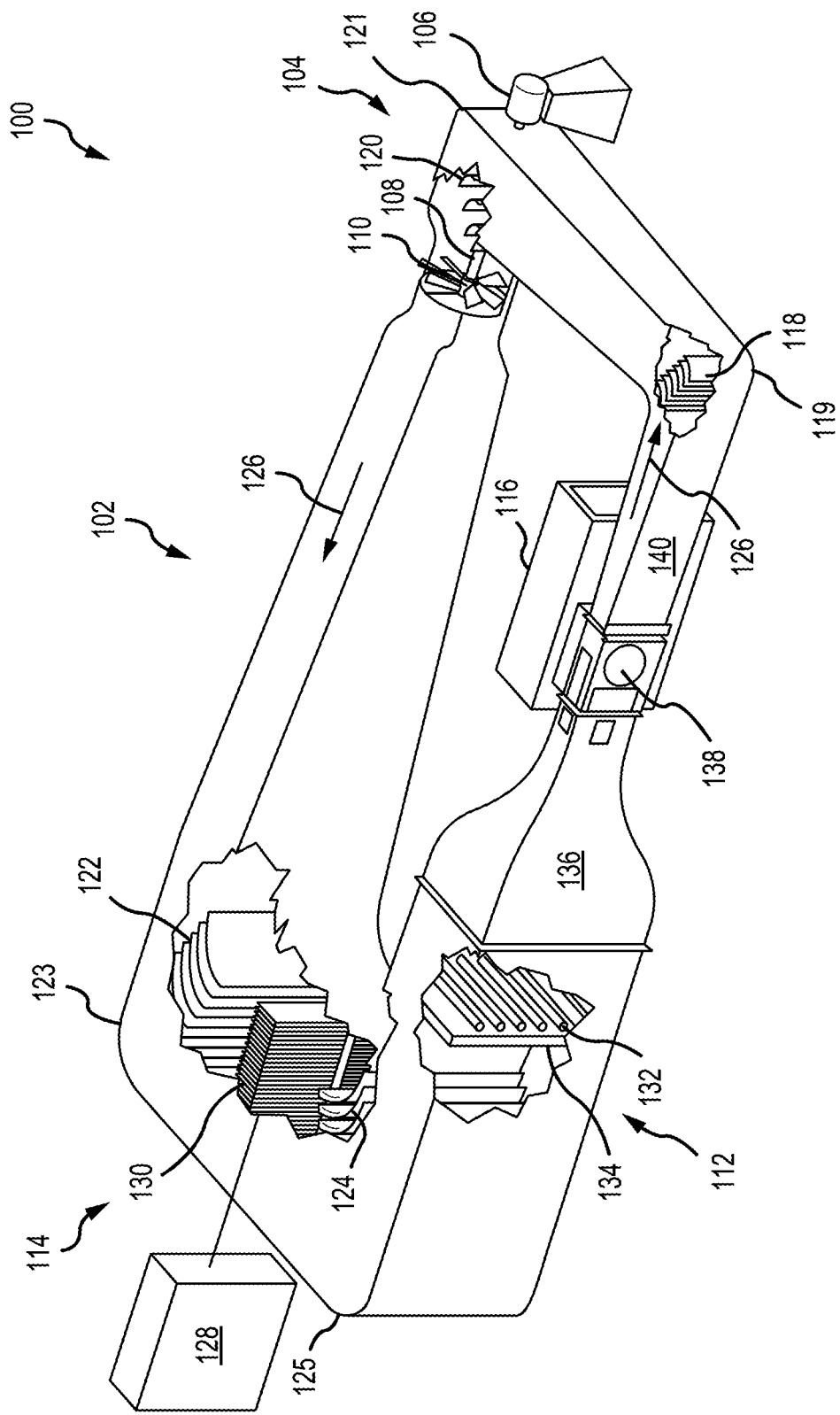
FIG. 1 illustrates an isometric view of a wind tunnel incorporating an icing simulation system with fixed contraction section, test section, and diffuser section in which the various embodiments may be implemented, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an," or "the" may include one or more than one and that reference to an item in the singular may also include the item in the plural. Further, all ranges may include upper and lower values and all ranges and ratio limits disclosed herein may be combined.

In 2015, the FAA released Title 14 FAR Part 25 Appendix O for Supercooled Large Drop Icing Conditions. These conditions are in addition to Title 14 FAR Part 25 Appendix C Atmospheric Icing Conditions. The Appendix C icing conditions are frequently simulated in a laboratory environment in one of a number of refrigerated icing wind tunnels (IWTs). The difficulty with simulating the new Appendix O conditions is that the new conditions contain larger water droplets than those in Appendix C. The larger Appendix O water droplets, due to having more mass, take a longer time reach the supercooled state than Appendix C drops. In addition, the additional mass causes the water droplets to tend to fall out of the airstream more readily than the lighter Appendix C water droplets.

Disclosed herein is a system and methods for translating a test section of an icing wind tunnel to expand the size range of water droplets. Currently, icing wind tunnels (IWTs) are arranged to have a test section downstream of the spray-bar nozzle section with a fixed symmetrical contraction section and then downstream of the test section a fixed diffuser section. Accordingly, in various embodiments, the side panels of the contraction and diffuser sections are vertically fixed, with the test section able to be positioned anywhere from at the centerline of the spray bars to at or below the bottom (floor) of the spray bar section. In various embodiments, the horizontal panels of the contraction and diffuser sections include flexible materials that provide for the contraction and diffuser sections to translate up or down to follow the test section. With a lowered position of the test section, the specific Appendix O spray nozzles may or may not be limited to upper quadrants of the spray bar nozzle section of the IWT to better control the water droplet pattern impinging on the model in the test section. In various embodiments, the test section may be able to be rotated about an axis that is perpendicular to the airstream and approximately horizontal to the ground (floor) to allow for a more direct alignment with the trajectory of the drops.

Referring now to FIG. 1, in accordance with various embodiments, an isometric view of a wind tunnel incorporating an icing simulation system with fixed contraction section, test section, and diffuser section in which the various embodiments may be implemented is illustrated. In various embodiments, the icing simulation system 100 includes wind tunnel 102, air drive system 104 (including motor 106, shaft 108, and axial fan 110), nozzle system 112 (including spray bars 132 and flow straightener 134), and cooling system 114 (including refrigeration system 128 and heat exchanger 130).

In various embodiments, wind tunnel 102 has turning vane 118 in corner 119 (corner #1), turning vane 120 in corner 121 (corner #2), turning vane 122 in corner 123 (corner #3), and turning vane 124 in corner 125 (corner #4). In various embodiments, turning vanes 118, 120, 122, and 124 aid in directing air flow 126 generated by air drive system 104 to turn or curve within wind tunnel 102. In various embodiments, air flow 126 is generated by air drive system 104. In this illustrative example, air drive system 104 includes motor 106, shaft 108, and axial fan 110. In various embodiments, air flow 126 is cooled using cooling system 114. In various embodiments, cooling system 114 includes refrigeration system 128 and heat exchanger 130. In various embodiments, refrigeration system 128 and heat exchanger 130 operate to cool air within air flow 126 passing by or through heat exchanger 130. In various embodiments, nozzle system 112 includes spray bars 132 and flow straightener 134. In various embodiments, spray bars 132 are configured to spray drops of water within wind tunnel 102. The drops of water are carried by the air flow 126 through contraction section 136, test section 138, and diffuser section 140.

Figure 2:
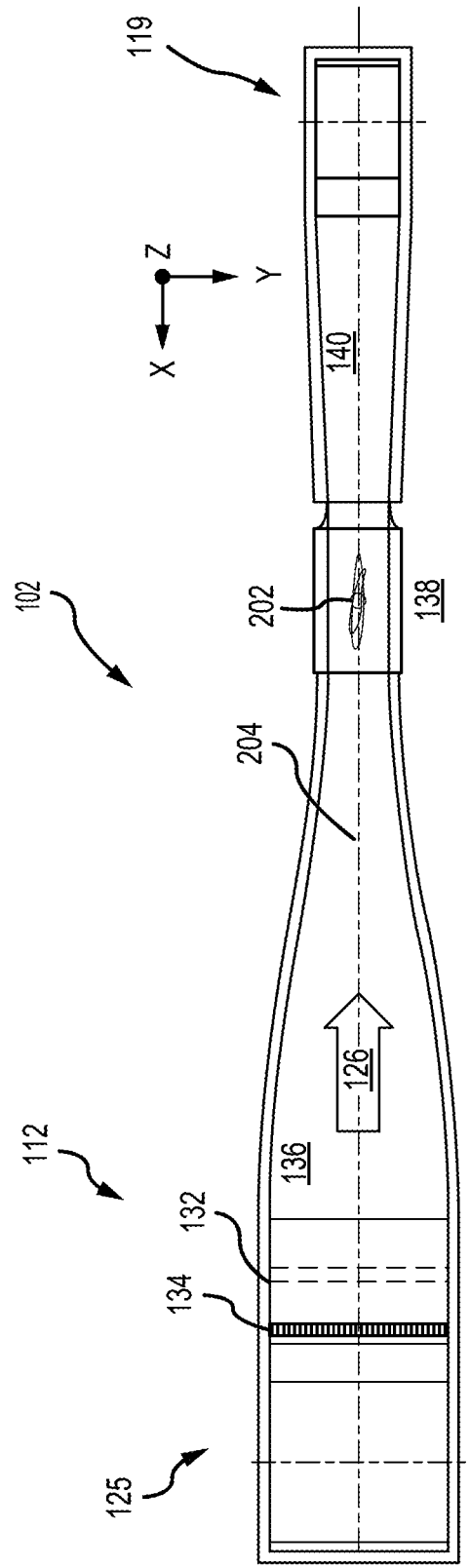
FIG. 2 illustrates a side view of a wind tunnel incorporating an icing simulation system in which the various embodiments may be implemented, in accordance with various embodiments.

Referring now to FIG. 2, in accordance with various embodiments, a side view of a wind tunnel incorporating an icing simulation system in which the various embodiments may be implemented is illustrated. The icing simulation system in FIG. 2 is similar to the icing simulation system 100 of FIG. 1, in that icing simulation system 100 in FIG. 2 includes wind tunnel 102, where wind tunnel 102 has turning vane 118 in corner 119 (corner #1) and turning vane 124 in corner 125 (corner #4). In various embodiments, turning vanes 118 and 124 aid in directing air flow 126 generated by air drive system 104 to turn or curve within wind tunnel 102. In various embodiments, air flow 126 is generated by the air drive system 104 of FIG. 1 and the air flow 126 passes through nozzle system 112. In various embodiments, nozzle system 112 includes spray bars 132 and flow straightener 134. In various embodiments, spray bars 132 are configured to spray drops of water within wind tunnel 102. The drops of water are carried by the air flow 126 through contraction section 136, test section 138, and diffuser section 140. In various embodiments, a test model 202 may be placed within test section 138 and the spray drops of water released by the spray bars 132 may be carried by the air flow 126 through contraction section 136 and impinging on the test model 202 in the test section 138. In various embodiments, a center of the contraction section 136, test section 138, and diffuser section 140 are aligned along a center axis 204 in a first direction, e.g., along an x-axis.

Figure 3:
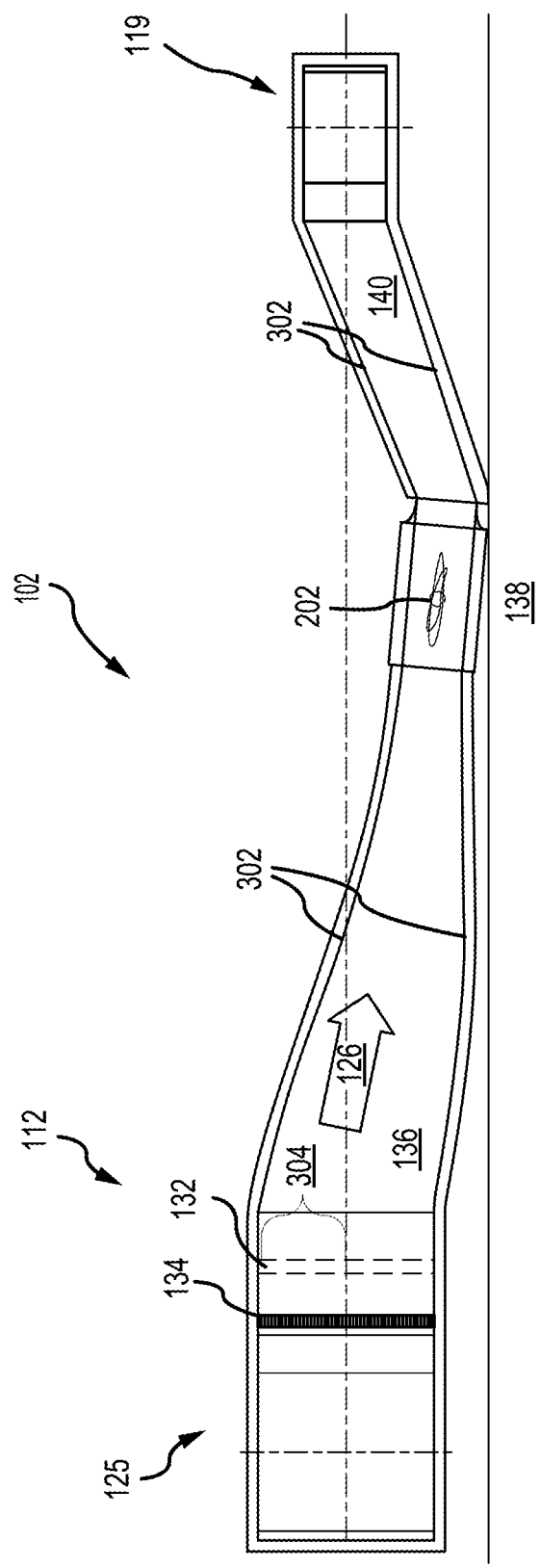
FIG. 3 illustrates a side view of a wind tunnel incorporating an icing simulation system for simulating Appendix O conditions, in accordance with various embodiments.

Referring now to FIG. 3, in accordance with various embodiments, a side view of a wind tunnel incorporating an icing simulation system for simulating Appendix O conditions is illustrated. In FIG. 3, the larger Appendix O water droplets, due to having more mass, take a longer time reach the supercooled state. In addition, the additional mass of Appendix O water droplets causes the water droplets to tend to fall out of the airstream more readily. The icing simulation system in FIG. 3 is similar to the icing simulation system 100 of FIG. 1, in that icing simulation system 100 in FIG. 3 includes wind tunnel 102, where wind tunnel 102 has turning vane 118 in corner 119 (corner #1) and turning vane 124 in corner 125 (corner #4). In various embodiments, turning vanes 118 and 124 aid in directing air flow 126 generated by air drive system 104 to turn or curve within wind tunnel 102. In various embodiments, air flow 126 is generated by the air drive system 104 of FIG. 1 and the air flow 126 passes through nozzle system 112. In various embodiments, nozzle system 112 includes spray bars 132 and flow straightener 134. In various embodiments, spray bars 132 are configured to spray drops of water within wind tunnel 102. The drops of water are carried by the air flow 126 through contraction section 136, test section 138, and diffuser section 140.

In various embodiments, the icing simulation system 100 includes horizontal panels 302, i.e., the top and bottom panels, of the contraction section 136 and diffuser section 140 that translate up or down, e.g., in a positive or negative y-direction, to follow a movement of the test section 138 that translates up or down, e.g., in a positive or negative y-direction, while the vertical panels, i.e. the side panels of the contraction section 136 and diffuser section 140 move along with the horizontal panels 302. In that regard, the horizontal panels 302 include flexible materials that provide for the contraction section 136 and diffuser section 140 to translate up or down to follow the test section 138. When performing a simulation under Appendix O conditions, the test section 138 is lowered so that the larger Appendix O water droplets, due to having more mass and falling out of the airstream, reach the test model 202 before contacting a lower panel of the horizontal panels 302. In various embodiments, with a lowered position of the test section 138, specific spray nozzles of spray bars 132 may or may not be limited to upper quadrants 304 of the spray bars 132 to control the water droplet pattern impinging on the test model 202 in the test section 138. In various embodiments, the test section may be able to be rotated about an axis, i.e., in a z-direction, that is perpendicular to the air flow 126 to allow for a more direct alignment with the air flow 126. Accordingly, in various embodiments, a test model 202 may be placed within test section 138 and the spray drops of water released by upper quadrants 304 of the spray bars 132 may be carried by the air flow 126 through contraction section 136, onto the test model 202 in the test section 138.

Figure 4:
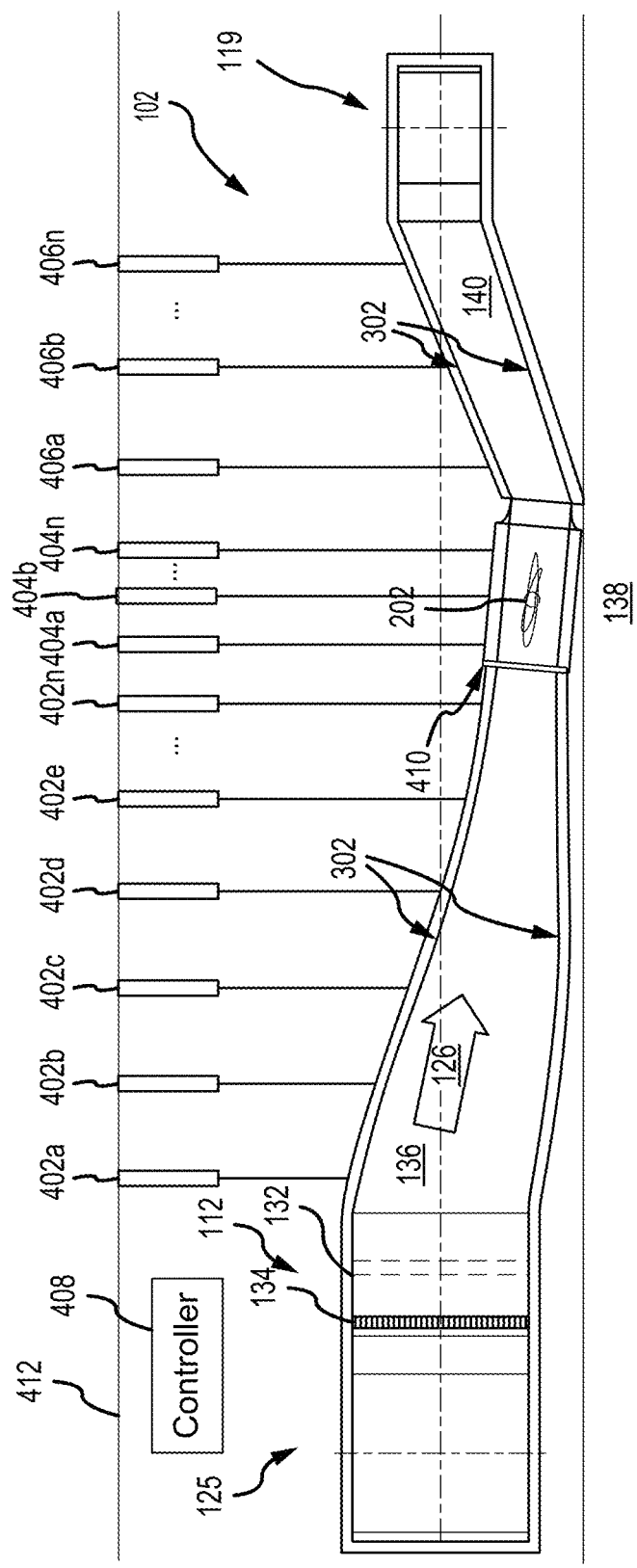
FIG. 4 illustrates a side view of a first implementation of translating a wind tunnel incorporating an icing simulation system for simulating Appendix O conditions, in accordance with various embodiments.

Referring now to FIG. 4, in accordance with various embodiments, a side view of a first implementation of translating a wind tunnel incorporating an icing simulation system for simulating Appendix O conditions is illustrated. In various embodiments, a first end of a set of actuators 402a-402n may be coupled to the horizontal panels 302 of the contraction section 136, a first end of a set of actuators 404a-404n may be coupled to the horizontal panels 302 of the test section 138, and a first end of a set of actuators 406a-406n may be coupled to the horizontal panels 302 of the diffuser section 140. In various embodiments, a second end of the set of actuators 402a-402n, a second end of the set of actuators 404a-404n, and a second end of the set of actuators 406a-406n may be coupled to a ceiling structure 412. Each actuator in the set of actuators 402a-402n, the set of actuators 404a-404n, and the set of actuators 406a-406n provide for translating the respective sections of the wind tunnel 102 in an up or down direction, e.g., in a positive or negative y-direction.

In various embodiments, each actuator in the set of actuators 402a-402n, the set of actuators 404a-404n, and the set of actuators 406a-406n is individually controlled by a controller 408. The controller 408 may include a logic device such as one or more of a central processing unit (CPU), an accelerated processing unit (APU), a digital signal processor (DSP), a field programmable gate array (FPGA), an application specific integrated circuit (ASIC), or the like. In various embodiments, the controller 408 may further include any non-transitory memory known in the art. The memory may store instructions usable by the logic device to perform operations as described herein. In various embodiments, the controller 408 controls each actuator in the set of actuators 402a-402n, the set of actuators 404a-404n, and the set of actuators 406a-406n based on data received from a sensor mechanism 410. In various embodiment, the sensor mechanism 410 takes the form of a laser sensor system. In that regard, the sensor mechanism 410 sends a laser beam into wind tunnel 102 where drops of water are generated by spray bars 132 in nozzle system 112. In various embodiments, the sensor mechanism 410 sends data about the water drops, i.e., droplet size or droplet direction, among others, to the controller 408. With feedback from the sensor mechanism 410, the controller 408 determines a directional impact on the model test, i.e., how the water droplets will be impinging the test model 202. Based on the determined directional impact, the controller 408 may adjust individual ones of the set of actuators 402a-402n, the set of actuators 404a-404n, and the set of actuators 406a-406n thereby translating the respective contraction section 136, test section 138, and diffuser section 140 of the wind tunnel 102 in an up or down direction, e.g., in a positive or negative y-direction, so that the water droplets are directly impinging on the test model 202 in the test section 138 during a subsequent test.

Figure 5:
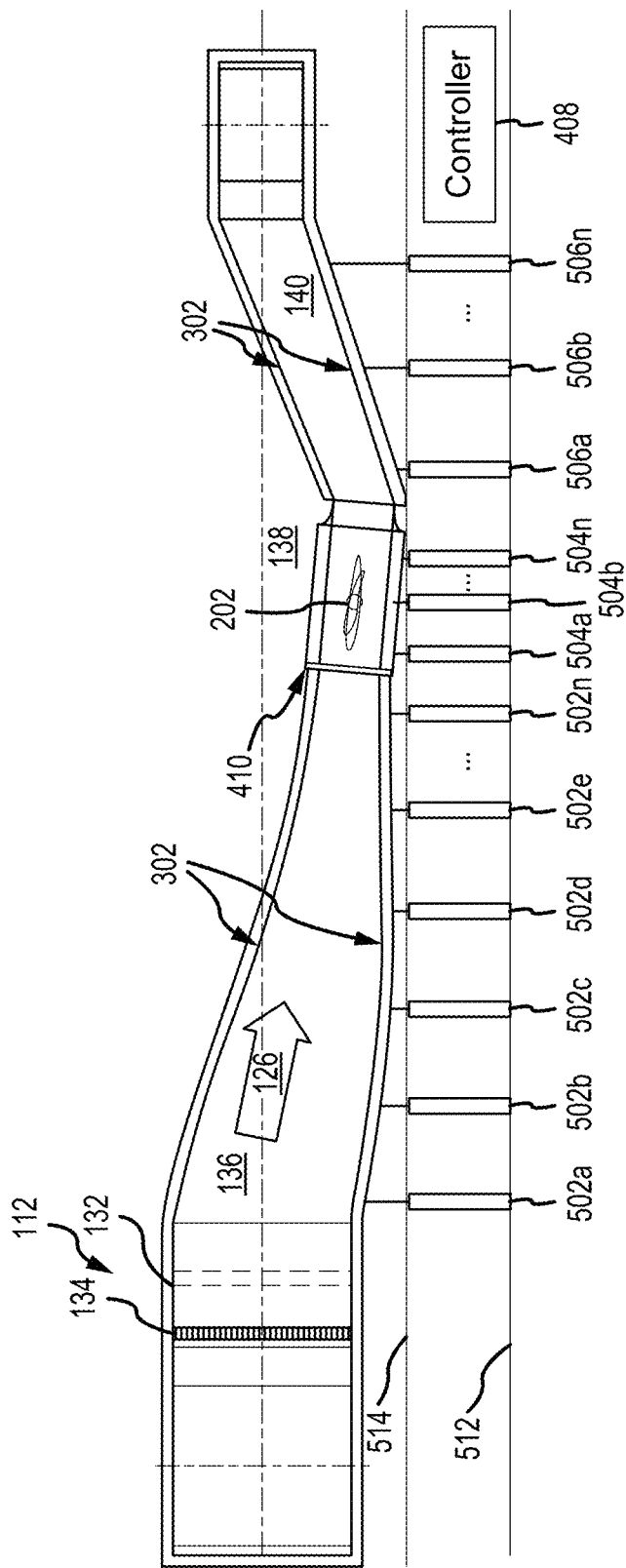
FIG. 5 illustrates a side view of a second implementation of translating a wind tunnel incorporating an icing simulation system for simulating Appendix O conditions, according to various embodiments.

Referring now to FIG. 5, in accordance with various embodiments, a side view of a second implementation of translating a wind tunnel incorporating an icing simulation system for simulating Appendix O conditions is illustrated. In various embodiments, a first end of a set of actuators 502a-502n may be coupled to the horizontal panels 302 of the contraction section 136, a first end of a set of actuators 504a-504n may be coupled to the horizontal panels 302 of the test section 138, and a first end of a set of actuators 506a-506n may be coupled to the horizontal panels 302 of the diffuser section 140. In various embodiments, a second end of the set of actuators 502a-502n, a second end of the set of actuators 504a-504n, and a second end of the set of actuators 506a-506n may be coupled to a subfloor structure 512 beneath floor 514. Each actuator in the set of actuators 502a-502n, the set of actuators 504a-504n, and the set of actuators 506a-506n provides for translating the respective sections of the wind tunnel 102 in an up or down direction, e.g., in a positive or negative y-direction.

In various embodiments, each actuator in of the set of actuators 502a-502n, the set of actuators 504a-504n, and the set of actuators 506a-506n is individually controlled by a controller 408. In various embodiments, the controller 408 controls each actuator in of the set of actuators 502a-502n, the set of actuators 504a-504n, and the set of actuators 506a-506n based on data received from a sensor mechanism 410. In various embodiments, the sensor mechanism 410 takes the form of a laser sensor system. In that regard, the sensor mechanism 410 sends a laser beam into wind tunnel 102 where drops of water are generated by spray bars 132 in nozzle system 112. In various embodiments, the sensor mechanism 410 sends data about the water drops, i.e., droplet size or droplet direction, among others, to the controller 408. With feedback from the sensor mechanism 410, the controller 408 adjusts individual ones of the set of actuators 502a-502n, the set of actuators 504a-504n, and the set of actuators 506a-506n thereby translating the respective contraction section 136, test section 138, and diffuser section 140 of the wind tunnel 102 in an up or down direction, e.g., in a positive or negative y-direction, so that the water droplets are directly impinging on the test model 202 in the test section 138.

Figure 6:
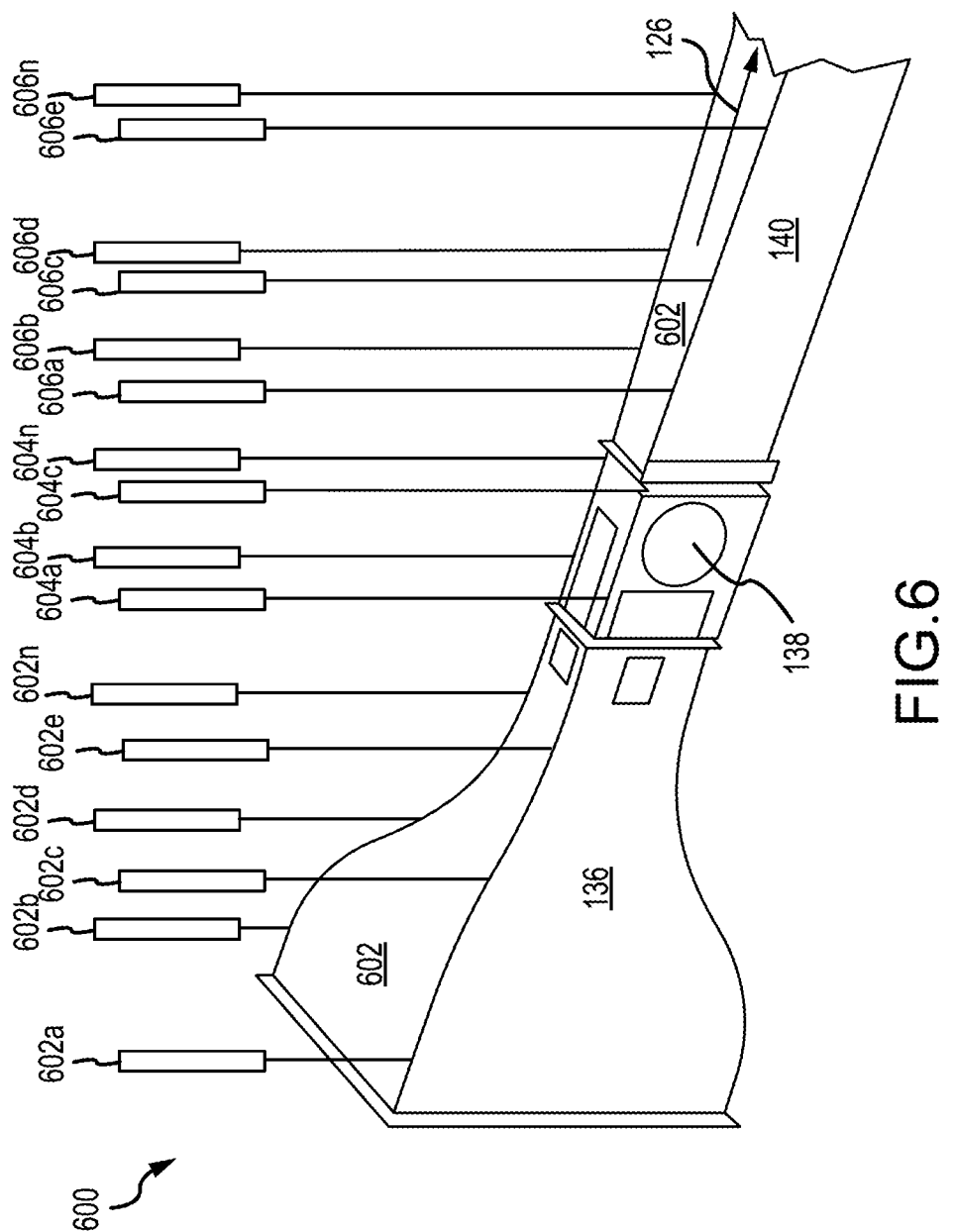
FIG. 6 illustrates an isometric view of the first implementation of translating a wind tunnel incorporating an icing simulation system for simulating Appendix O conditions, according to various embodiments.

Referring now to FIG. 6, in accordance with various embodiments, an isometric view of the first implementation of translating a wind tunnel incorporating an icing simulation system for simulating Appendix O conditions is illustrated. In various embodiments, a first end of a set of actuators 602a-602n may be coupled to the horizontal panels 302 of the contraction section 136, a first end of a set of actuators 604a-604n may be coupled to the horizontal panels 302 of the test section 138, and a first end of a set of actuators 606a-606n may be coupled to the horizontal panels 302 of the diffuser section 140. In various embodiments, a second end of the set of actuators 602a-602n, a second end of the set of actuators 604a-604n, and a second end of the set of actuators 606a-606n may be coupled to a ceiling structure, such as ceiling structure 412 of FIG. 4. Each actuator in the set of actuators 602a-602n, the set of actuators 604a-604n, and the set of actuators 606a-606n provides for translating the respective sections of the wind tunnel 102 in an up or down direction, e.g., in a positive or negative y-direction.

Figure 7:
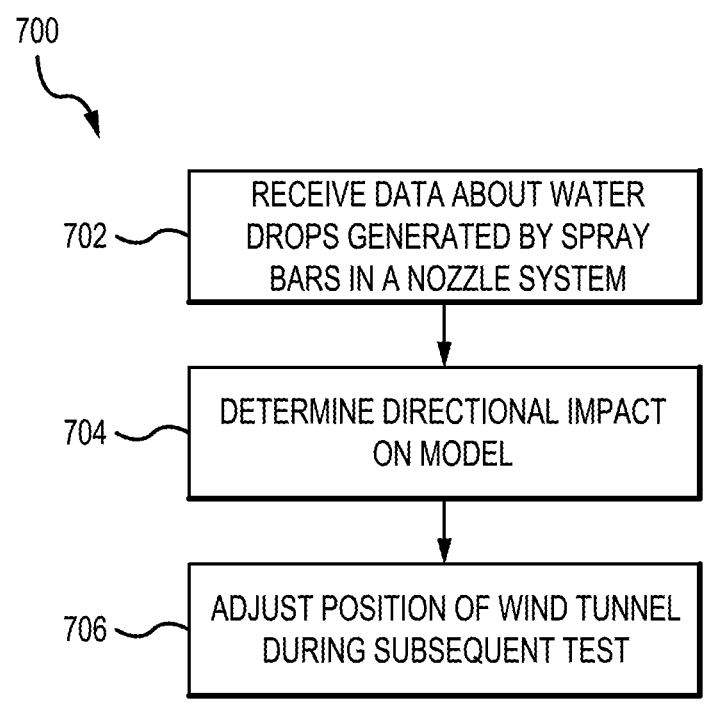
FIG. 7 illustrates a method for translating sections of an icing wind tunnel to expand a size range of water droplets, according to various embodiments.

Referring now to FIG. 7, in accordance with various embodiments, a method 700 for translating sections of an icing wind tunnel to expand a size range of water droplets is illustrated. The method 700 may be performed by a controller 408 described above with respect to FIG. 4 or 5. At block 702, the controller 408 receives data from sensor mechanism 410 about water droplets, i.e., droplet size or droplet direction, among others, generated by spray bars 132 in nozzle system 112. At block 704, the controller 408 uses the data about the water droplets to determine a directional impact on the test model 202, i.e., how the water droplets will be impinging the test model 202. At block 706, based on the determined directional impact, the controller 408 may adjust individual ones of the set of actuators coupled to the respective contraction section 136, test section 138, and diffuser section 140 of the wind tunnel 102 in an up or down direction, e.g., in a positive or negative y-direction, so that the water droplets are directly impinging on the test model 202 in the test section 138 during a subsequent test.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about," or "approximately" as used herein represent an amount close to the stated amount that still performs a desired function or achieves a desired result. For example, the term "substantially," "about," or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A system for translating sections of an icing wind tunnel configured to expand a size range of water droplets, the system comprising:
   a set of actuators coupled to a set of sections of the icing wind tunnel; and
   a controller coupled to the set of actuators, wherein the controller is configured to:
   receive data relating to a water droplet generated within the icing wind tunnel;
   determine a directional impact on a model within the icing wind tunnel based upon the data relating to the water droplet; and
   adjust at least one of the set of sections of the icing wind tunnel in at least one of an up or a down direction in a subsequent test.

2. The system of claim 1, wherein the set of sections comprises a contraction section, a test section, and a diffuser section.

3. The system of claim 2, wherein the set of actuators comprises a first set of actuators, a second set of actuators, and a third set of actuators and wherein the first set of actuators is coupled to the contraction section, the second set of actuators is coupled to the test section and the third set of actuators is coupled to the diffuser section.

4. The system of claim 3, wherein horizontal panels of the contraction section and the diffuser section are comprised of flexible materials that provide for the contraction section and the diffuser section to translate in at least one of the up or the down direction to follow the test section.

5. The system of claim 2, wherein the test section rotates about an axis that is perpendicular to an air flow within the icing wind tunnel.

6. The system of claim 1, wherein the data about the water droplet comprises at least one of a droplet size or a droplet direction.

7. The system of claim 6, wherein the system further comprises:
   a sensor, wherein the sensor sends a laser beam to identify the droplet size or the droplet direction into the icing wind tunnel where drops of water are generated by spray bars.

8. The system of claim 7, wherein the sensor is a laser sensor system.

9. The system of claim 1, wherein, when one or more of the set of sections is translated downward, the water droplet is generated from an upper quadrant of spray bars in the icing wind tunnel.

10. A control system for translating sections of an icing wind tunnel configured to expand a size range of water droplets, the control system comprising:
    a set of actuators coupled to a set of sections of the icing wind tunnel;
    a controller coupled to the set of actuators; and
    a tangible, non-transitory memory configured to communicate with the controller, the tangible, non-transitory memory having instructions stored thereon that, in response to execution by the controller, cause the controller to perform operations comprising:
receive data about a water droplet generated within the icing wind tunnel;
determine a directional impact on a model within the icing wind tunnel based upon the data relating to the water droplet; and
adjust at least one of the set of sections of the icing wind tunnel in at least one of an up or a down direction in a subsequent test.

11. The control system of claim 10, wherein the set of sections comprises a contraction section, a test section, and a diffuser section.

12. The control system of claim 11, wherein the set of actuators comprises a first set of actuators, a second set of actuators, and a third set of actuators and wherein the first set of actuators is coupled to the contraction section, the second set of actuators is coupled to the test section and the third set of actuators is coupled to the diffuser section.

13. The control system of claim 12, wherein horizontal panels of the contraction section and the diffuser section are comprised of flexible materials that provide for the contraction section and the diffuser section to translate in at least one of the up or the down direction to follow the test section.

14. The control system of claim 11, wherein the test section rotates about an axis that is perpendicular to an air flow within the icing wind tunnel.

15. The control system of claim 10, wherein the data about the water droplet comprises at least one of a droplet size or a droplet direction.

16. The control system of claim 15, wherein the control system further comprises:
a sensor, wherein the sensor sends a laser beam to identify the droplet size or the droplet direction into the icing wind tunnel where drops of water are generated by spray bars.

17. The control system of claim 16, wherein the sensor is a laser sensor system.

18. The control system of claim 10, wherein, when one or more of the set of sections is translated downward, the water droplet is generated from an upper quadrant of spray bars in the icing wind tunnel.

19. A method for translating sections of an icing wind tunnel to expand a size range of water droplets, the method comprising:
receiving data about a water droplet generated within the icing wind tunnel;
determining a directional impact on a model within the icing wind tunnel based upon data relating to the water droplet; and
adjusting at least one of a set of sections of the icing wind tunnel in at least one of an up or a down direction in a subsequent test.

20. The method of claim 19, wherein the data about the water droplet comprises at least one of a droplet size or a droplet direction and wherein a sensor sends a laser beam to identify the droplet size or the droplet direction into the icing wind tunnel where drops of water are generated by spray bars to identify the droplet size or the droplet direction.

* * * * *